March 21, 1950     T. J. PETHES     2,501,613
POWER TRANSMITTING MECHANISM
Filed Jan. 9, 1948     2 Sheets-Sheet 1
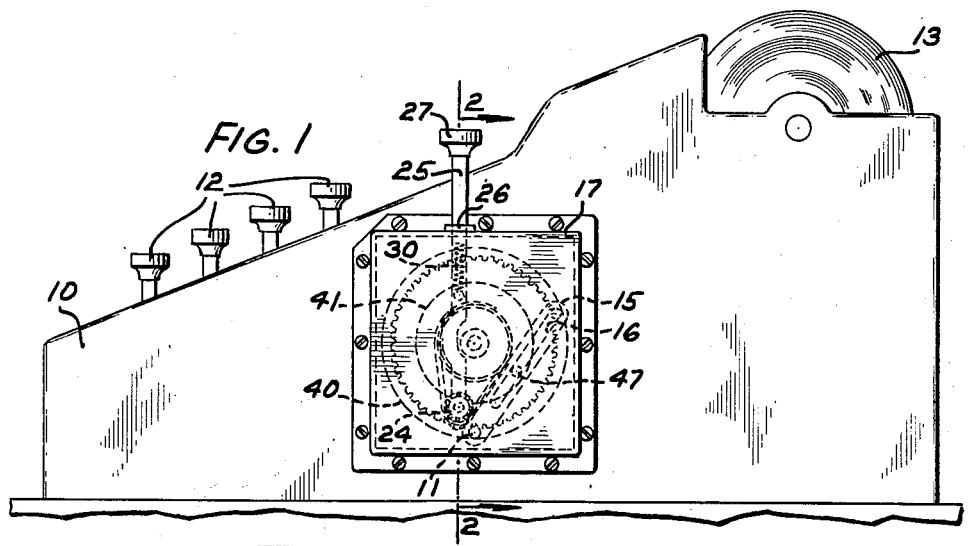
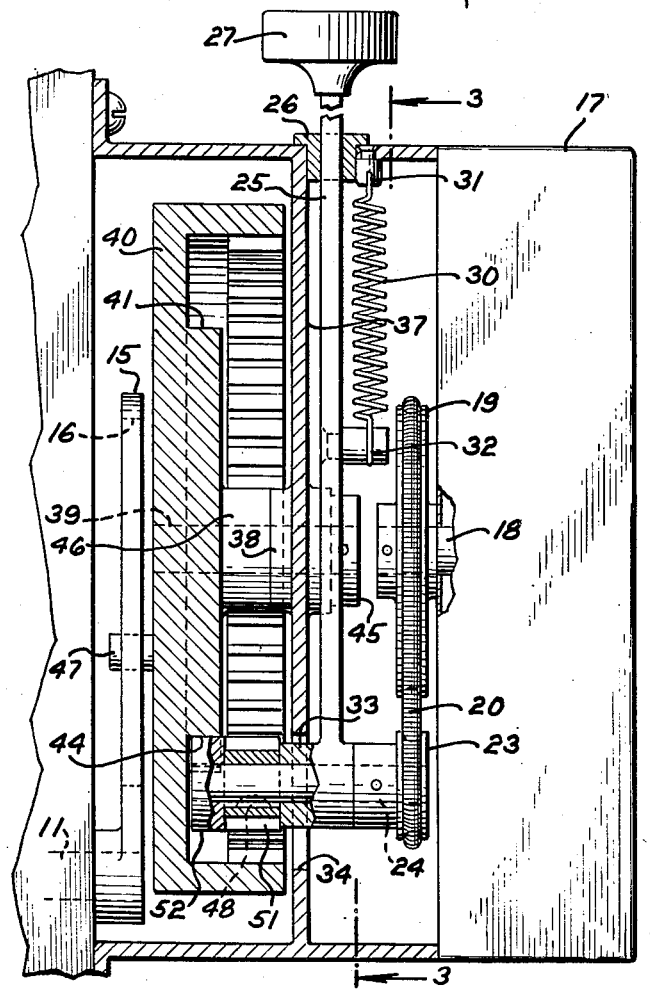
INVENTOR
T. J. PETHES
BY E. H. Kane
ATTORNEY March 21, 1950 T. J. PETHES 2,501,613
POWER TRANSMITTING MECHANISM
Filed Jan. 9, 1948 2 Sheets-Sheet 2
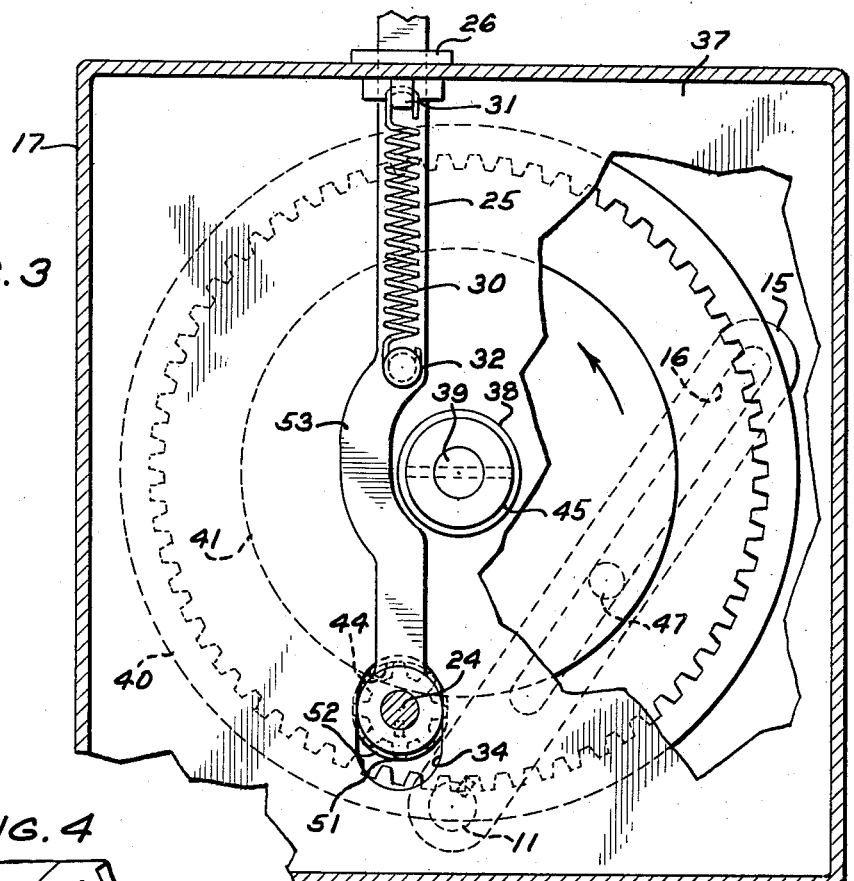
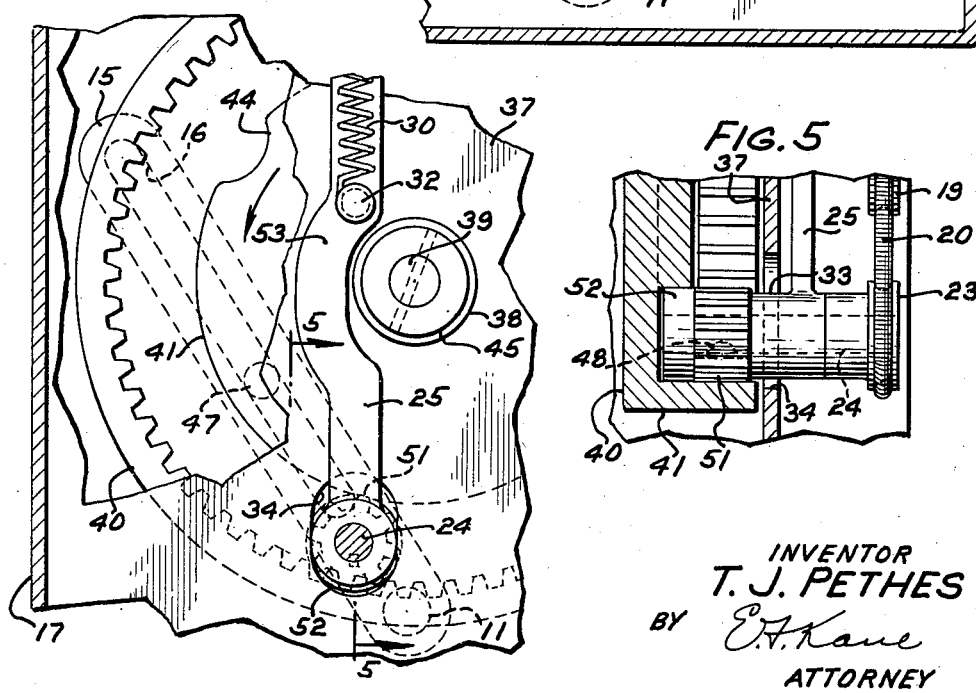
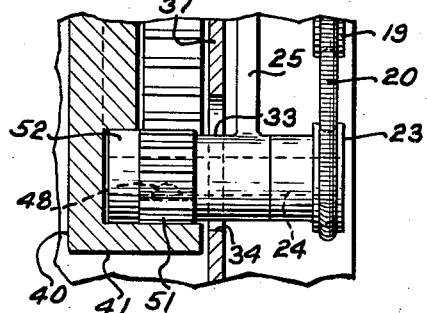
INVENTOR
T. J. PETHES
BY E. F. Kane
ATTORNEY Patented Mar. 21, 1950

2,501,613

UNITED STATES PATENT OFFICE 2,501,613

POWER TRANSMITTING MECHANISM

Theodore J. Pethes, Elmwood Park, Ill., assignor to Western Electric Company, Incorporated, New York, N. Y., a corporation of New York Application January 9, 1948, Serial No. 1,329

10 Claims. (Cl. 74—405)

1

This invention relates to power transmitting mechanisms and more particularly to a manually operable power transmitting mechanism for coupling a rotatable driven member to a continuously rotating driving member.

An object of the invention is the provision of a simple and practicable power transmitting mechanism which is readily operable to connect a rotatable driven member to a continuously rotating driving member.

In one embodiment of the invention as disclosed hereinafter, the power transmitting mechanism is shown, for ease of illustration, as adapted to drive the operating shaft of an adding machine of the type wherein the operating shaft must be rocked through a portion of one revolution to enter digits, previously set up by punching keys, in the accumulator of the machine. In this embodiment of the invention there is provided a power transmitting mechanism comprising an internal ring gear carrying a crank pin, which is engaged in a slotted lever fixed to the driven shaft of the machine, the ring gear being provided with a coaxially arranged interrupted cam surface. The gear is adapted to mesh with a motor driven pinion fixed to a shaft, which also carries a cam follower normally resting in the cam interruption so that the pinion is out of mesh with the gear, the shaft being journalled on a manually operable spring retracted plunger. Fixed to the pinion shaft is a sheave, which is continuously driven from a motor driven sheave by a yieldable belt. Upon a momentary pressure being exerted on the plunger, the cam follower is withdrawn from the cam interruption and simultaneously therewith the pinion and gear mesh, whereupon the gear will be rotated through one revolution to impart oscillation to the driven shaft of the computing machine. After one revolution of the gear, the cam follower moves into the cam interruption, due to the action of the spring retracted plunger, thus withdrawing the pinion from driving engagement with the gear.

Other objects and advantages of the invention will be understood by referring to the following detailed description when considered in conjunction with the accompanying drawings, in which Fig. 1 is a side elevation of a computing machine equipped with a power transmitting mechanism embodying the features of the invention;

Fig. 2 is an enlarged fragmentary vertical section, partly in elevation, taken on the line 2—2 of Fig. 1;

Fig. 3 is a fragmentary vertical section, taken on the line 3—3 of Fig. 2, with the parts in their normal position;

Fig. 4 is a fragmentary view similar to Fig. 3, showing the parts during an operating cycle; and Fig. 5 is a vertical detail section taken on the line 5—5 of Fig. 4.

Referring to the drawing, and more particularly to Fig. 1, one embodiment of the invention is shown applied, for example, to a conventional type computing or adding machine, indicated in general at 10. A driven shaft 11, which extends at one end outside the housing of the machine 10 (Figs. 1, 2, 3 and 4) usually has fixed thereto a hand lever (not shown), which is manually rotated through a portion of a revolution in a counter-clockwise direction, as viewed in Figs. 1, 2 and 3, after the operator has completed setting up a computation by depressing certain keys 12 of the machine. This partial rotation of the driven shaft 11 clears the setup and records it on a strip of paper fed from a supply 13 and simultaneously enters in an accumulator (not shown) an amount controlled by the keys set up, whereupon, upon release of the hand lever, the driven shaft 11 is returned to its normal position. In applying applicant's invention to the machine 10, the usual hand lever mentioned above is removed and in its place there is installed a lever 15, having a longitudinally extending slot 16.

Attached to the side wall of the housing of the machine 10, from which one end of the driven shaft 11 extends, is a housing 17, in the right hand portion of which (Fig. 2) is enclosed a suitable type of electric motor (not shown). The shaft of this motor, indicated at 18 (Fig. 2), has fixed thereto a grooved sheave 19, around which is trained a yieldable spring belt 20, also trained around a grooved sheave 23 fixed to one end of a shaft 24. Intermediate its length, the shaft 24 is rotatably journalled in an apertured lower end of an irregularly shaped vertically extending plunger 25, which, at its upper end, is slidably mounted in a bushing 26 and extends above the upper wall of the housing 17. To the upper outer end of the plunger 25 is attached a finger button 27 for actuating the plunger in a downward direction. A tension spring 30, having its opposite ends attached to the upper wall of the housing 17 and to the plunger 25 at 31 and 32, respectively, is normally effective to return the plunger to its upper position, as shown in Figs. 1, 2 and 3 upon completion of an operating cycle of the power transmitting mechanism. The upper end of the plunger 25 slides in the bushing 26 and its lower end is guided by an extending annular bearing portion 33 surrounding the shaft 24 of the plunger at its left side (Fig. 2), which is fitted to ride in a slot 34 provided in a vertical partition wall 37, which divides the housing 17 into two compartments.

Journalled in an elongated bearing 38 extending from opposite sides of and integral with the partition wall 37 is a shaft 39, the axis of which is coincident with the axis of the motor shaft 18. To the left end of the shaft 39 is fixed an internal ring gear 40, having an internal coaxially arranged interrupted cam surface 41. In the present embodiment of the invention, the cam surface 41 is provided with a single interruption, in the form of a curved depression, indicated at 44. Fixed to the right end of the shaft 39 (Fig. 2) is a collar 45, abutting one end face of the bearing 38, which, together with a hub 46 on the ring gear 40 abutting the opposite end face of the bearing 38, serves to retain the ring gear in a fixed position relative to the partition wall 37. Extending from the left side face of the ring 40 (Fig. 2) is a crank pin 47, which is operatively engaged in the slot 16 of the lever 15, whereby, when the ring gear is rotated counterclockwise one revolution, as indicated by the arrow (Fig. 3), the lever 15 will be rocked from its normal position, indicated in Fig. 3, to the position shown in Fig. 4 and back to its normal position.

To the shaft 24, carried by the plunger 25, is keyed, as indicated at 48, a pinion 51, the teeth of which are adapted to mesh with the teeth of the ring gear 40 during an operating cycle of the mechanism, as shown in Fig. 4. In the normal position of the actuating plunger 25, as shown in Fig. 3, the pinion 51 is in a retracted position with the teeth thereof out of mesh with the teeth of the ring gear 40. Rotatably carried upon the extreme left end of the shaft 24 (Fig. 2) is a cam follower 52, which is arranged to ride upon the periphery of the cam surface 51 of the ring gear 40 during an operating cycle of the mechanism. During this movement of the cam follower 52, the teeth of the pinion 51 are maintained in proper driving mesh with the teeth of the ring gear 40. When the mechanism is not in operation, as shown in Fig. 3, the cam follower 52 is at rest in the cam surface depression 44 and the pinion 51 is disengaged from the ring gear 40. In the present embodiment of the power transmitting mechanism, the plunger 25 is formed with an offset portion 53 to provide clearance space for the hub 46 of the ring gear in any position of the plunger.

The operation of the above-described power transmitting mechanism is as follows: It will be assumed that the power circuit to the motor (not shown), which drives the shaft 18, is closed and that the shaft is continuously rotating and, by means of the yieldable belt 20, the pinion 51 is idly rotating in a counterclockwise direction, as indicated by the arrow in Fig. 3, the plunger 25 at this time being in its upper normal position with the cam follower 52 engaged in the cam surface depression 44 of the ring gear 40. After an operator has set up a computation on the machine 10 by depressing certain of the keys 12 and thereafter wishes to clear the setup, enter it in the accumulator, and record it on the paper strip fed from the supply 13, the plunger 25 is momentarily depressed by means of the key 27 and against the action of the tension spring 30. Thus the cam follower 52 is withdrawn from the cam surface depression 44 and simultaneously therewith the rotating pinion 51 is moved transversely into mesh with the ring gear 40 and immediately causes it to rotate in a counter-clockwise direction, as indicated by the arrows (Figs. 3 and 4). It will be noted that the provision of the yieldable belt 20 permits this bodily movement of the pinion 51 and cam follower 52 in the actuation of the plunger 25 while still maintaining the drive from the motor shaft 18 to the pinion. The cam surface depression 44 on the ring gear 40 immediately moves away from the cam follower 52 and the cam follower moves onto the coaxially arranged cam surface 41, thus holding the pinion 51 in driving mesh with the ring gear 40. This arrangement necessitates only a momentary depression of the plunger 25, whereupon it may be immediately released.

In the counter-clockwise rotation of the ring gear 40, the crank pin 47 carried thereby and engaged in the slot 16 of the lever 15 rocks the latter and the attached driven shaft 11 of the computing machine 10 in a counter-clockwise direction (Figs. 3 and 4) a sufficient number of degrees or a fixed portion of a revolution, to clear and record the computation set up by the operator by means of the keys 12. Upon the ring gear 40 completing one revolution, the cam follower 52 rides into the cam surface depression 44 and the pinion 51 movable with the cam follower, is withdrawn from driving engagement with the ring gear 40, due to the action of the spring retracted plunger 25. This completes one cycle of operation of the power transmitting mechanism during which the driven shaft 11 has been rocked the necessary number of degrees and has been returned to its normal position.

It is contemplated that any number of degrees of a revolution of the ring gear 40 may be effected by simply forming additional depressions in the cam surface 41 and thus one revolution of the ring gear would not be required to complete a cycle of operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A power transmitting mechanism comprising driving and driven members, means for rotating said driving member, means for moving said driving member transversely of its axis of rotation during its rotation into driving relation with said driven member, means for constantly urging said driving member in an opposite direction, a cam surface coaxial and rotatable with said driven member, said surface having a depression therein, and a cam follower transversely movable with said driving member and engageable with said surface during the driving of said driven member and movable into said depression to disengage the members under the influence of said urging means.

2. A power transmitting mechanism comprising driving and driven members, means for rotating said driving member, means for moving said driving member transversely of its axis of rotation during its rotation into driving relation with said driven member, means for constantly urging said driving member moving means and driving member in an opposite direction, a cam surface rotatable with said driven member, said surface having a depression therein, and a cam follower transversely movable with said driving member and engageable with said surface during the driving of said driven member and movable into said depression to disengage the members under the influence of said urging means.

3. A power transmitting mechanism comprising driving and driven members, means for rotating said driving member, an actuator for moving said driving member transversely of its axis of rotation during its rotation into driving relation with said driven member, means for constantly urging said actuator and driving member in an opposite direction, a cam surface rotatable with said driven member, said surface having a depression therein, and a cam follower movable with said driving member and engageable with said surface during the driving of said driven member and movable into said depression to disengage the driving and driven members under the influence of said urging means.

4. A power transmitting mechanism comprising driving and driven members, means for rotating said driving member, a manually operable plunger for moving said driving member transversely of its axis of rotation during its rotation into driving relation with said driven member, means for constantly urging said plunger and driving member in an opposite direction, a cam surface coaxial and rotatable with said driven member, said surface having a recess therein, and a cam follower movable with said driving member and engageable with said surface during the driving of said driven member and movable into said recess to disengage the driving and driven members under the influence of said urging means.

5. A power transmitting mechanism comprising an internal ring gear, a pinion for meshing with said gear to drive the same, means for rotating said pinion, means for moving in one direction said pinion transversely of its axis of rotation, during its rotation into driving relation with said gear, means for constantly urging said pinion moving means and pinion in an opposite direction, a cam surface rotatable with said gear, said surface having a recess therein, and a cam follower movable with said pinion and engageable with said surface during the driving of said gear and movable into said recess to disengage the gear and pinion under the influence of said urging means.

6. A power transmitting mechanism comprising an internal ring gear having formed coaxially therein a cam surface with a curved depression therein, a pinion for meshing with said gear to drive the same, means for rotating said pinion, means for moving in one direction said pinion transversely of its axis of rotation during its rotation into driving relation with said gear, a retractile element effective for constantly urging said pinion moving means and pinion in an opposite direction, and a cam follower movable with said pinion and engageable with said surface during the driving of said gear and movable into said depression to disengage the gear and pinion under the influence of said retractile element.

7. A power transmitting mechanism for coupling a source of power to an element to be rocked through a number of degrees and returning it to its initial position comprising driving and driven members, means for rotating said driving member, means for moving said driving member transversely of its axis of rotation during its rotation into driving relation with said driven member, means for constantly urging said driving member moving means and driving member in an opposite direction, a cam surface rotatable with said driven member, said surface having a depression therein, a crank pin carried by said driven member having a sliding operative engagement with an element to be rocked, and a cam follower movable with said driving member and engageable with said surface during the driving of said driven member and movable into said depression after said element has been rocked and returned to its initial position to disengage the driving and driven members under the influence of said urging means.

8. A power transmitting mechanism for coupling a source of power to an element to be rocked from an initial position and returned thereto, comprising a cup-shaped internal ring gear having formed coaxially therein a cam surface with a depression therein, a pinion for meshing with said gear to drive the same, means for rotating said pinion, a manually operable actuator for moving said pinion transversely of its axis of rotation during its rotation into driving relation with said gear, a crank pin carried by said gear and slidably engaged in a slot extending longitudinally in said element to be rocked, and a cam follower movable with said pinion and engageable with said cam surface during the driving of said gear and movable into said depression after said element has been rocked and returned to its initial position to disengage the pinion and gear.

9. A power transmitting mechanism comprising a gear to be driven, a pinion movable into mesh with said gear, a shaft for supporting said pinion, means movable in a direction perpendicular to the axis of said shaft for supporting said pinion for movement into and out of mesh with said gear, cam means driven by said gear for actuating said pinion support to hold the pinion in mesh with the gear, resilient means for urging the pinion to move out of mesh with the gear, a portion of said cam means being formed to render said resilient means effective, and a driving means for said pinion.

10. A single revolution power transmitting mechanism comprising a driving pinion, means for driving said pinion, a cam roller coaxial with said pinion, a shaft for supporting said cam follower and pinion, means for moving said shaft perpendicular to the axis of said shaft, a gear positioned to be driven by said pinion but normally out of mesh therewith, and a cam fixed to said gear for cooperation with the cam roller and formed to hold the pinion in mesh with the gear throughout a predetermined portion of the revolution of the gear, said cam having a surface to receive the cam follower upon movement of said pinion out of mesh with said gear.

THEODORE J. PETHES.

No references cited.